2,743,205

COMPOSITION AND PROCESS FOR TREATING METAL SURFACES

James W. Condon, Edgewood, Pa., assignor to Westinghouse Electric Corporation, East Pittsburgh, Pa., a corporation of Pennsylvania No Drawing. Application October 14, 1954, Serial No. 462,400

7 Claims. (Cl. 148—6.15)

This invention relates to compositions and processes for treating metal surfaces for the purpose of producing thereon phosphate coatings.

In the production of protective phosphate coatings on surfaces of metals, it has been recognized that in many cases the metal surfaces often react slowly with applied phosphating compositions so that the process is unduly prolonged. In addition, many metals acquire only incomplete or defective phosphate coatings through which a substantial portion of the original metal surface is exposed and, therefore, will become readily corroded. Furthermore, it is desirable that the phosphate coatings comprise the finest possible crystalline structure, and preferably a crystalline structure which when inspected under a microscope at a magnification of 75 × reveals only fine crystals and substantially no exposed metal.

It is desirable that there be available compositions that will activate metal surfaces so that when the metal surface is immersed in a conventional phosphating solution there will be produced thereon a fine crystalline coating of phosphate which substantially completely covers all of the treated surfaces. It would be further advantageous that the activating composition be such that it may be combined with a detergent or cleaner so that the metal surface is simultaneously cleansed and activated. Therefore, additional equipment for carrying out the phosphating process, other than the conventional equipment, will not be required in order to provide for applying the activating composition.

The object of this invention is to provide an activating composition for treating metal in the process of producing phosphate coatings on the metal surfaces wherein the activating composition comprises lithium.

A further object of the invention is to provide an activating composition comprising lithium combined with an alkali orthophosphate.

Another object of the invention is to provide for combining an alkaline cleaner with a lithium and alkali orthophosphate activating composition.

Other objects of the invention will, in part, be obvious and will, in part, appear hereinafter. Reference should be had to the following detailed description for a better understanding of the nature and objects of the invention.

I have discovered an excellent aqueous activating composition for treating iron, zinc, cadmium, aluminum and alloys in which these metals predominate. Such activating composition comprises an aqueous solution in which there is dissolved the dry residue previously prepared by dissolving a lithium compound and an alkali orthophosphate in water and evaporating to dryness. Surfaces activated in this composition by an immersion therein for a period of time of the order of one minute may be treated with conventional phosphating compositions and they will rapidly acquire an extremely fine grained phosphate coating. Such coatings, when examined under a microscope, show an extremely fine crystal structure that substantially completely covers the metal surfaces.

The activating composition is prepared by dissolving a water soluble lithium compound such, for example, as lithium chloride or lithium sulfate and an alkali orthophosphate such as disodium phosphate or dipotassium phosphate in proportions providing at least one part of lithium per 50 parts of $PO_4$. Mixtures of alkali orthophosphates may be employed in preparing the composition. Thus, good results are secured by admixing monopotassium phosphate and dipotassium phosphate. The optimum results appear to be secured with disodium orthophosphate. The proportions of the lithium compound to the disodium orthophosphate may be varied over a substantial range of proportions. The dried residue secured upon evaporating the initial solution should be dissolved in water to produce an activating composition having from 0.001% to 0.6% by weight of lithium and at least 0.004% by weight of $PO_4$. The optimum aqueous activating composition appears to comprise approximately 0.015% by weight of lithium and 0.475% by weight of $PO_4$. However, I have secured equally beneficial activation from aqueous compositions comprising 0.043% by weight of lithium and 1.2% by weight of $PO_4$; 0.224% lithium and 1.02% $PO_4$; and 0.446% lithium with 0.2% $PO_4$.

The lithium compound may be combined with disodium phosphate for example in proportions to provide from 1 to 125 parts of lithium for every 50 parts of $PO_4$. The mixture after dissolving in water and evaporating to dryness constitutes the activating salt. This salt may be shipped or stored for indefinite periods of time without losing its activity. Whenever it is desired to prepare an activating solution, a quantity of this salt is dissolved in water and such solution is employed for treating metal surfaces.

In order to effectuate both cleaning and activation of the metal surfaces, the dry salt residue may be combined with a detergent in proportions providing from 0.1 to 10% by weight of the dry residue and the balance being the detergent. Numerous detergents may be employed for cleaning metal surfaces in order to remove therefrom grease, dirt and other contamination on the surfaces so as to expose clean metal suitable for phosphating treatment.

Effective detergents comprise alkaline compounds which when dissolved in water in proportions of the order of one ounce per gallon produce a pH of from about 10 to 12½. Suitable examples thereof are soda ash, sodium bicarbonate, sodium silicate, trisodium phosphate, sodium hydroxide, borax and mixtures of two or more. Other suitable detergents are alkali soaps such, for example, as sodium stearates, ammonium palmitates, amine soaps, such as the reaction product of triethanolamine with stearic acid or oleic acid or other fatty acids. The soaps may be employed in the formulation with a hydrocarbon solvent such for example as kerosene. It will be understood that mixtures of two or more of such alkali cleaners may be employed. Furthermore, synthetic detergents such as the sulfates and sulfonates of fatty acids may be employed in order to provide for satisfactory cleaning.

The following example is illustrative of a suitable combined cleaner and activating composition. 1.52 parts by weight of lithium chloride and 25 parts by weight of disodium phosphate (heptahydrate) are dissolved in separate volumes of water and the two volumes are then mixed with stirring. The solution is evaporated to dryness, the final drying being at approximately 105° C. A fine white dried salt results. In some cases, it may be desirable to pulverize the salt in order to promote its more ready combination with water in producing an activating composition. This predip salt contains approximately 1.73% lithium and 61.87% of PO₄. Three parts by weight of this salt dissolved in 400 parts by weight of water produces an excellent aqueous activating composition. Zinc metal, which without activation does not respond satisfactorily to phosphating compositions, after treatment for one minute in this composition, will react with a phosphating composition to produce excellent coatings which have extremely fine crystals and substantially no bare spots when examined under the microscope at powers of up to 75 ×.

There was introduced into the activating composition three ounces per gallon of sodium hydroxide, two ounces per gallon of trisodium phosphate and one ounce per gallon of sodium carbonate. Zinc plated steel was immersed for one minute in the composition at a temperature of 150° F. and was satisfactorily cleaned in this limited time while the zinc surfaces were activated for subsequent phosphating treatment. The cleaned zinc surfaces were then immersed in a phosphating composition comprising the following:

| | | |
|---|---|---|
| Zinc oxide | lbs | 1.53 |
| Nickel carbonate | lbs | 0.248 |
| Phosphoric acid (75%) | gal | 0.5 |
| Nitric acid | gal | 0.0487 |
| Water, to make | gal | 1 |

This aqueous solution was diluted with 11.5 gallons of additional water and heated to 160° F. The activated zinc surfaces were completely covered with a fine crystalline phosphate coating in less than 30 seconds immersion in this phosphating solution. Following the immersion, the zinc surfaces were rinsed with water and then immersed for a few seconds in a sealing bath comprising an aqueous solution containing 8 ounces of chromic acid per 100 gallons of water at a temperature of approximately 200° F. After withdrawal from the sealing bath, the members dried upon being exposed to the atmosphere. Examination of the members under a 75 × microscope revealed complete coverage with fine crystals over the entire surface of the member.

If desired, titanium may be substituted for a part of the lithium compounds in preparing the activating seal. Alternatively, the lithium-disodium phosphate activating salts may be combined with titanium or zirconium activating salts disclosed in Patents 2,310,239 and 2,462,196, respectively.

Other suitable compositions for activating metal surfaces comprised 21.06 parts of disodium phosphate and 10 parts of lithium chloride; and 4.26 parts by weight of disodium phosphate and 20 parts by weight of lithium chloride. Also, dipotassium phosphate was substituted for disodium phosphate in these examples and gave satisfactory results.

Numerous phosphating compositions may be applied to the metal surfaces after they have been activated, or cleaned and activated with the lithium compositions disclosed herein. Such phosphating compositions are well known and need not be detailed herein.

The activating compositions alone or combined with detergents may be applied to sheet steel, steel bars and rods, zinc die castings, galvanized sheets, electroplated zinc members, sheets of aluminum or aluminum alloys and cadmium plated members. In all cases, the activating compositions may be applied to the members for approximately one minute of time and when treated soon thereafter with a phosphating composition, the surfaces will acquire an excellent phosphate coating in less than one minute, often in 10 to 30 seconds time.

It will be understood that the above description is illustrative and not limited.

I claim as my invention:

1. An aqueous solution for treating metal surfaces in order to render them more active in the subsequent formation of phosphate coatings thereon, comprising as its essential components, from 0.001% to 0.6% by weight of lithium present as a compound thereof and at least 0.004% by weight of PO₄ present as an alkali orthophosphate, there being present from 1 to 125 parts of lithium for each 50 parts by weight of PO₄, the lithium compound and alkali orthophosphate having been previously dissolved in water and evaporated to dryness.

2. The aqueous solution of claim 1, wherein a detergent in an amount of at least 1 ounce per gallon is present to enable cleaning of the metal surfaces simultaneously with their activation.

3. The aqueous solution of claim 1, wherein titanium replaces a part of the lithium.

4. A composition comprising the dry residue derived by dissolving in water a lithium compound and an alkali orthophosphate, the lithium compound providing lithium in an amount equal to at least 2% of the weight of the PO₄ contributed by the alkali orthophosphate, there being present from 1 to 125 parts of lithium for each 50 parts by weight of PO₄, and evaporating the solution to dryness.

5. A composition comprising from 0.1% to 10% by weight of (a) the dry residue derived by dissolving in water a lithium compound and an alkali orthophosphate, the lithium compound providing lithium in an amount equal to at least 2% of the weight of the PO₄ contributed by the alkali orthophosphate, there being present from 1 to 125 parts of lithium for each 50 parts by weight of PO₄, and (b) the balance being an alkaline cleaner from the group consisting of alkaline alkali metal compounds, ammonia soaps and amine soaps.

6. In the process of producing phosphate coatings on the surface of iron, zinc, cadmium, aluminum and alloys in which these metals predominate, the steps comprising activating the surface by immersing it in an aqueous solution comprising as its essential components, from 0.001% to 0.6% by weight of lithium present as a compound thereof and at least 0.004% by weight of PO₄ present as an alkali orthophosphate, there being present from 1 to 125 parts of lithium for each 50 parts by weight of PO₄, the lithium compound and alkali orthophosphate having been previously dissolved in water and evaporated to dryness, and soon thereafter applying to the activated metal surfaces a phosphating solution to produce in a period of time of less than one minute a protective phosphate coating.

7. In the process of producing phosphate coatings on the surface of iron, zinc, cadmium, aluminum and alloys in which these metals predominate, the steps comprising activating and cleaning the surface by immersing it in an aqueous solution comprising as its essential components, from 0.001% to 0.6% by weight of lithium present as a compound thereof and at least 0.004% by weight of PO₄ present as an alkali orthophosphate, there being present from 1 to 125 parts of lithium for each 50 parts by weight of PO₄, the lithium compound and alkali orthophosphate having been previously dissolved in water and evaporated to dryness and a detergent in an amount of at least one ounce per gallon to clean the metal surface, and soon thereafter applying to the activated metal surfaces a phosphating solution to produce in a period of time of less than one minute a protective phosphate coating.

References Cited in the file of this patent

UNITED STATES PATENTS

| | | |
|---|---|---|
| 2,329,065 | Lum et al. | Sept. 7, 1943 |
| 2,462,196 | Jernstedt | Feb. 22, 1949 |